(12) United States Patent
Mathias et al.

(10) Patent No.: US 6,857,575 B2
(45) Date of Patent: Feb. 22, 2005

(54) OPTICAL BUSINESS CARD

(75) Inventors: Arne Mathias, Recklinghausen (DE); Alexander Cioc, Kleve (DE)

(73) Assignee: Fuji Magnetics GmbH, Kleve (DE)

( * ) Notice: Subject to any disclaimer, the term of this patent is extended or adjusted under 35 U.S.C. 154(b) by 77 days.

(21) Appl. No.: 10/221,866

(22) PCT Filed: Feb. 15, 2001

(86) PCT No.: PCT/EP01/01696
§ 371 (c)(1),
(2), (4) Date: Dec. 11, 2002

(87) PCT Pub. No.: WO01/69522
PCT Pub. Date: Sep. 20, 2001

(65) Prior Publication Data
US 2004/0050939 A1 Mar. 18, 2004

(30) Foreign Application Priority Data
Mar. 17, 2000 (DE) .......................... 100 13 287

(51) Int. Cl.⁷ .............................................. G06K 19/00
(52) U.S. Cl. ................... 235/487; 235/483; 235/484; 235/485; 235/486
(58) Field of Search ............................. 235/487, 483, 235/484, 485, 486

(56) References Cited

U.S. PATENT DOCUMENTS

| | | | | |
|---|---|---|---|---|
| 5,059,774 A | * | 10/1991 | Kubo et al. ................. 235/454 |
| 6,016,298 A | * | 1/2000 | Fischer ....................... 369/75.1 |
| 6,078,557 A | * | 6/2000 | Pierson ......................... 369/273 |
| 6,304,544 B1 | * | 10/2001 | Pierson et al. ............... 369/273 |
| 6,400,675 B1 | * | 6/2002 | Everidge et al. ............. 369/273 |
| 6,424,616 B1 | * | 7/2002 | Al-Askari .................... 369/289 |
| 6,484,940 B1 | * | 11/2002 | Dilday et al. ................ 235/454 |

FOREIGN PATENT DOCUMENTS

| | | |
|---|---|---|
| DE | 299 09 005 U1 | 10/1999 |
| DE | 299 17 105 U1 | 1/2000 |
| GB | 22 97 187 A | 7/1996 |
| GB | 23 31 959 A | 6/1999 |
| WO | 86 05 620 A1 | 9/1986 |

* cited by examiner

Primary Examiner—Michael G. Lee
Assistant Examiner—Kimberly D. Nguyen
(74) Attorney, Agent, or Firm—Herbert Dubno

(57) ABSTRACT

An optical storage system capable of use as a business card or a credit card of a rectangular card lying flat against an optical storage medium which can have a circular track for the optical storage of data. Symmetrical fastening elements around the whole optical storage medium secure the card and the optical storage medium together in two positions at right angles to one another. In one position the system has a rectangular configuration corresponding to that of a card. In the second position arcuate ends of the optical storage element lie along the longitudinal edges of the card to enable the system to be placed in a reader or writer for the optical data.

14 Claims, 3 Drawing Sheets

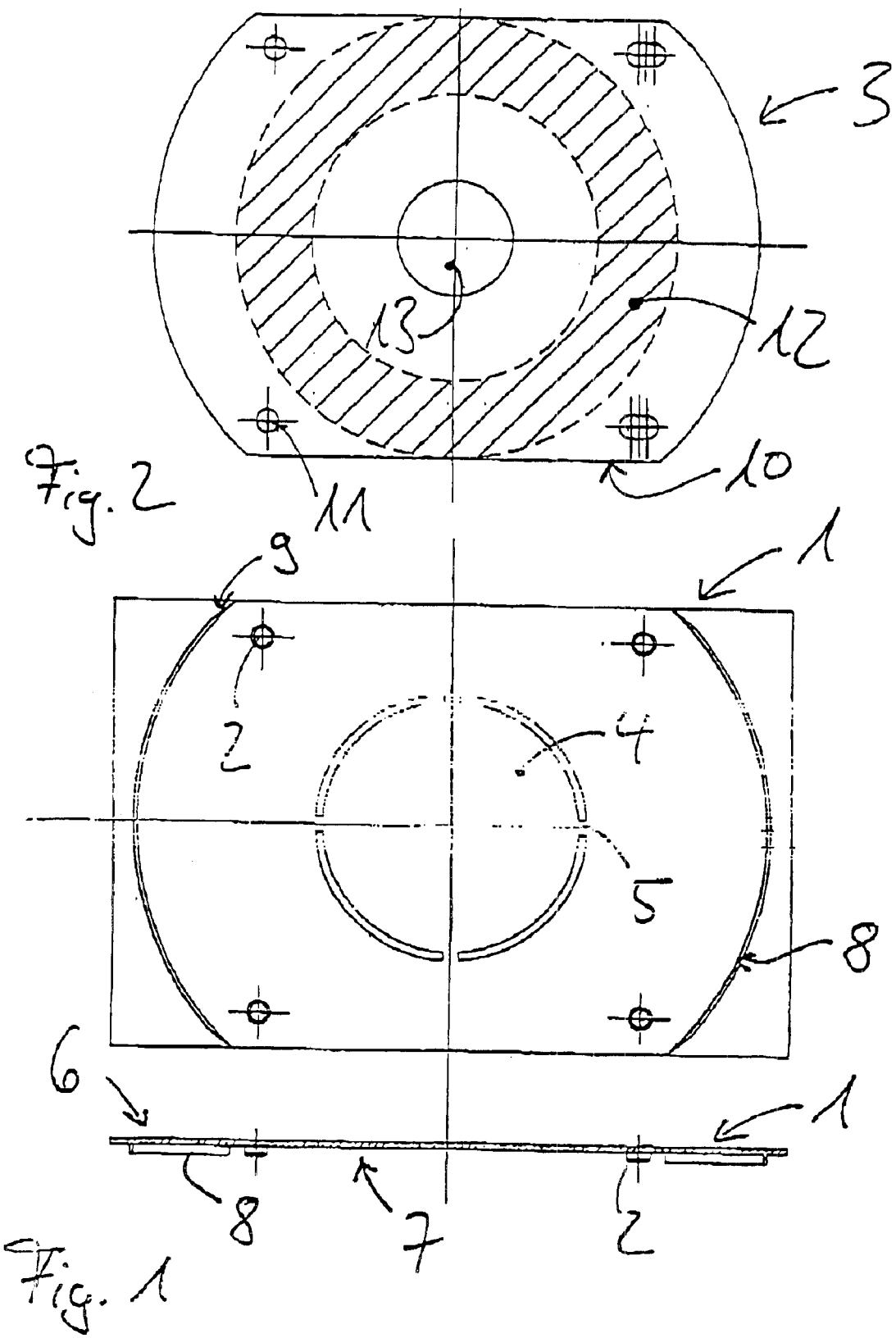

OPTICAL BUSINESS CARD

CROSS REFERENCE TO RELATED APPLICATIONS

This application is a national stage of PCT/EP01/01696 filed 15 Feb. 2001 and is based upon German national application 100 13 287.1 filed 17 Mar. 2000 under the International Convention.

FIELD OF THE INVENTION

The present invention relates to a system which has two elements whereby the first element is an optical storage medium having the shape of a circular disk with two parallel cut edges of cut off segments symmetrical to the center point and whereby the second element, especially of synthetic resin, is formed as a card in a size and/or the format of a business card or credit card, and which for reading of the storage medium, are joined together and are insertable in a drive of a writing and/or reading appliance.

BACKGROUND OF THE INVENTION

With the technical development of optical storage media, ever greater information densities and ever lower production costs have enabled these media, especially the simple compact disk (CD), to become mass-produced articles which have found many applications in the meantime as information carriers. Thus at the present time, instead of brochures, CDs are distributed as advertising and can provide the user, via a personal computer, a large quantity of information as to the respective business. It should be noted that the designation "CD" as used below is to be understood not only as a CD in the conventional sense but to include also other comparable media like DVD or CDRWs (rewritable CDs).

In the course of developments, CDs have been conceived as business cards which can have the rectangular format of a credit card. In this case, the CD is cut to the shape of the credit card and on its upper side is printed as an information text. In another embodiment, a business card of plastic has as its reverse side, a disk on which the information is stored. For this type of information and advertising carrier, CDs of a size of 80 millimeters are used which permit playing in a standard drive. Corresponding to the standard, the cards have on their rear sides guide structures which are intended for the centering and thus reliable retention of the card in the recess of the drive.

It is however problematical with the known cards that they encounter problems when used in standard drives and can give rise to complete destruction of the drive. The problematical phase in the playing of the card is the end phase when the rotation of the card is braked and the card drops into the recess. At this moment, the card, which is poorly guided in the recess, can have its edges ride on the edge of the recess provided in the drive. The resulting imbalance produces a jamming of the card in the drive. The drive thus cannot ensure sufficiently stable storage of the cards used heretofore. The problems which then result can damage the ability of the card to serve for advertising purposes and the damage to the drive can give rise to the need for indemnification for the damage by the distributor of the card.

A further problem of the heretofore used card is that the information region or medium region, thus the described structure of the medium, must be protected from external effects in that the cards must be packed in protective sleeves. Such a protective sleeve does not contribute to convenience and customer-friendly handling of the card and its acceptance and advertising effectiveness is reduced.

OBJECT OF THE INVENTION

The object of the present invention, therefore, is to provide a system with such a card which makes the card simpler and more economical to manufacture and thus especially effective for advertising purposes, contributes to comfortable handling of the card and above all in the playing of the card ensures reliable operation in any drive.

SUMMARY OF THE INVENTION

This object is achieved with a system encompassing two elements, whereby the first element is an optical storage medium that has the shape of a circular disk with two parallel cut edges of cut-off segments symmetrical to the a center point. The second element is a card, especially formed from synthetic resin, in the size of a business card or credit card, which can be inserted in combination with the optical storage medium in a drive of a writing appliance. According to the invention means is provided which fastens the two elements when the card and the storage medium are laid flat against one another in two relatively rotated positions.

The card can have the rectangular format of a business card or credit card. The card can be circular and has two parallel cut edges of cut off segments symmetrical to the center point, whereby the card and storage medium complete a circular disk in a state in which one is laid onto the other.

The fastening means can enable a releasable attachment of the elements. The spacing of the cut piece in the case of the storage medium corresponds generally to the width of the card. The two positions can be rotated by 90° relative to one another, whereby in one position, the cut edges of the storage medium are parallel to the longitudinal edges of the card.

The means for releasable attachment can be pins and bores on the elements. The card can have pins on its back side which are insertable in the corresponding bores in the storage medium for retention. The pins can be frictionally retained in the bores.

The card can have raised guide edges on its backside which described a circle, whereby the diameter of the circle corresponds substantially to the diameter of the storage medium. The guide edges on their end faces can form insertion aids.

The diameter of the circle and the diameter of the storage medium can be approximately 80 millimeters. The card can have a central, especially circular, opening which in the mounted system is coaxial to the central bore of the storage medium. The opening can be produced by breaking out a card part held by an intentional break location. The card and/or the storage medium can be printed with advertising.

The significance of the system according to the invention is that it has two initially separate elements, namely, the cut CD and the card formed especially from a synthetic resin, which before insertion into a drive can be assembled in the manner according to the invention. The system of the two elements has consequently two states: in the first state it has the form of a credit card and can be handled and stowed as such (transport state) while in the second state it has a format similar to that of a CD and can be reliably inserted into a drive and can be read and/or can be written to (playing state). In the transport state the card and the storage medium are thus two flat elements lying one upon the other and which, in this state, have the thickness and the size of a credit card. The stack can be conveniently protected in any pocket.

In an especially preferred embodiment, the card is rectangular with mutually parallel longitudinal edges and mutually parallel transverse edges and thus has the format of a credit card. The system has in its playing state the area of a rectangular card with outwardly bulging longitudinal edges. It is also possible to form the transverse edges so that they are of the shape of circular arcs so that the card and the rounded storage medium can be rotated through 90° relative to one another and are flush with one another to form a circular disk in the nature of a CD in the playing state.

As has been indicated, prior to insertion of the system into the drive, the two elements can be rotated relative to one another so that the CD projects beyond the edges of the card and the active surface serving to position the system in the drive is thereby increased. In the ideal case, after a 90° shift of the elements, a complete circular disk with a diameter of especially 80 millimeters is formed which can be received with precision in the corresponding recess of a drive and reliably moved in the drive like a normal CD.

In order to retain the two elements during the operation in the drive reliably against one another, means is provided according to the invention which clearly holds the elements together. In an especially simple embodiment, the two elements can be held together by an adhesive, especially an adhesion adhesive securing the elements together, whereby adhesives which enable a releasable assembly of the elements are to be preferred. The elements can, in an advantageous embodiment, also be releasably secured to one another by simple mechanical means, like, for example, indexing elements.

The system according to the invention has the special advantage already mentioned that it ensures a more reliable operation of the drive in which it is inserted because of the improved centering. The large area system with its guide structure in the form of a full circle, fits ideally into the predetermined standard of the drive. The system is characterized by a significantly improved circular travel in the drive and is less susceptible to any imbalance which may arise. Simultaneously, the system is simple, economical and capable of mass production as well as being convenient to handle. The two elements require only that they be separated and rotated relative to one another and reassembled before the insertion into the drive. After use, the original transport state can be also simply restored whereby the system can fit in any pocket.

The system is thus reusable as often as desired.

The system offers further advantages. Thus the card can be used in a simple manner as protection and packaging for the sensitive CD. To this end, the system is so conceived that the written or writable region of the CD, in the assembled state of the system is protected by lying against the surface of the card. Upon conversion of the playing state, the CD is not only swung through 90° but also turned around so that the written region is exposed. The system can be returned to its original condition in the reverse order. With a CD which is so turned, both the surface of the card and the surface of the CD can serve to receive the imprint of the advertising. As a result, the advertising effectiveness of the system can be further increased. The surfaces which are printable with information or advertising can be increased in a special embodiment of the system in that the normally central passage required for retaining the system in the drive and in the form of a bore is initially closed by a part of the card held in place by intentional break [weakened] locations. Before the first insertion of the system into the drive, the central part of the card can be simply broken out.

BRIEF DESCRIPTION OF THE DRAWING

Special embodiments of the system of the invention are described in the following in connection with FIGS. 1 to 6.

They show:

FIG. 1 an individual card in a credit card format,

FIG. 2 an individual storage medium,

SPECIFIC DESCRIPTION

Figure 4:
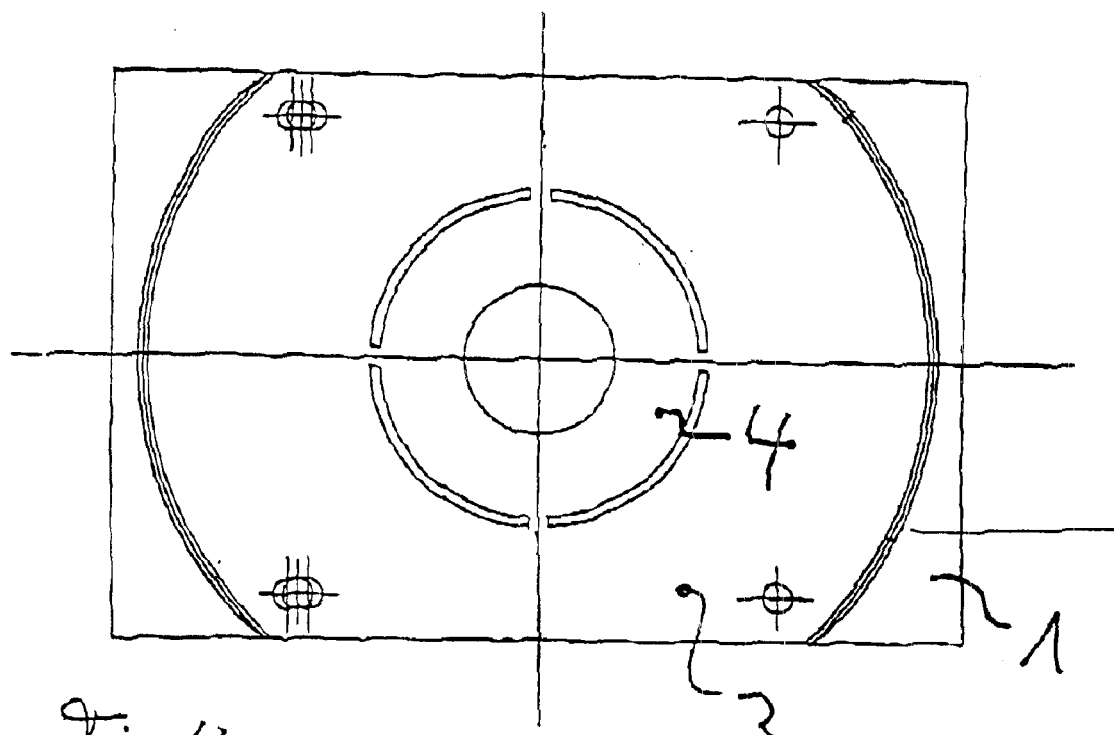
FIG. 4 a system in the assembled transport state.

In FIG. 1 a rectangular card 1 of a synthetic resin is shown which has approximately the format of a known credit card. In the elevational view and the cross sectional view therebelow, it can be seen that the surface of the card 1 has four pins 2 serving as means for the releasable attachment of a CD 3 (FIG. 2). The pins 2 are symmetrical and at the corners of a square at the center the card has a disk-shaped card part 4 which is separated by perforations forming intentional break locations with the remainder of the card. After breaking out of the card part 4, the card 1 has a central circular opening of a predetermined diameter which is coaxial in the assembled system with the central bore of the storage medium 3 and serves to retain and fix the system on the drive of a reading appliance. The card 1 has a front side 6 serving as an advertising surface and a back side 7 on which the raised guide edges 8 are formed. The guide edges 8 define circular arcs whose inner diameter corresponds to the outer diameter of the storage medium 3 while observing a slight play. The guide edges 8 at the end phases 9 have insertion aids which are effective in the operation-ready state of the system (FIG. 3).

In FIG. 2 the storage medium is illustrated as a CD 3 which has the form of a circular disk with two parallel cut edges 10, whereby the cut edges 10 correspond to width of the card 1. As a consequence the CD 3 can be mounted on the card 1 coextensively. For releasable attachment of the CD 3 on the card 1, bores 11 are provided in the CD 3 with the arrangement of the pins 2. The pins 2 are so dimensioned that they index in the bores 11 with a certain retaining force. The information-carrying middle region 12, is like the ring in the surface of known CDs. The standard bore 13 for receiving the CD 3 is likewise to be seen.

In FIG. 4, the system is shown in its assembled state (playable state) in which the longitudinal axes of the two elements include an angle of 90°. Card 1 and storage medium 2 are laid flat against one another and retention of the two elements 1 and 3 is ensured by the pins 2 projecting into the bores 11. In this state, the middle region 12 lies against the underside of the card 1 and is thereby protected from external influence. The card part 4 in this state has not yet been broken out.

Figure 3:
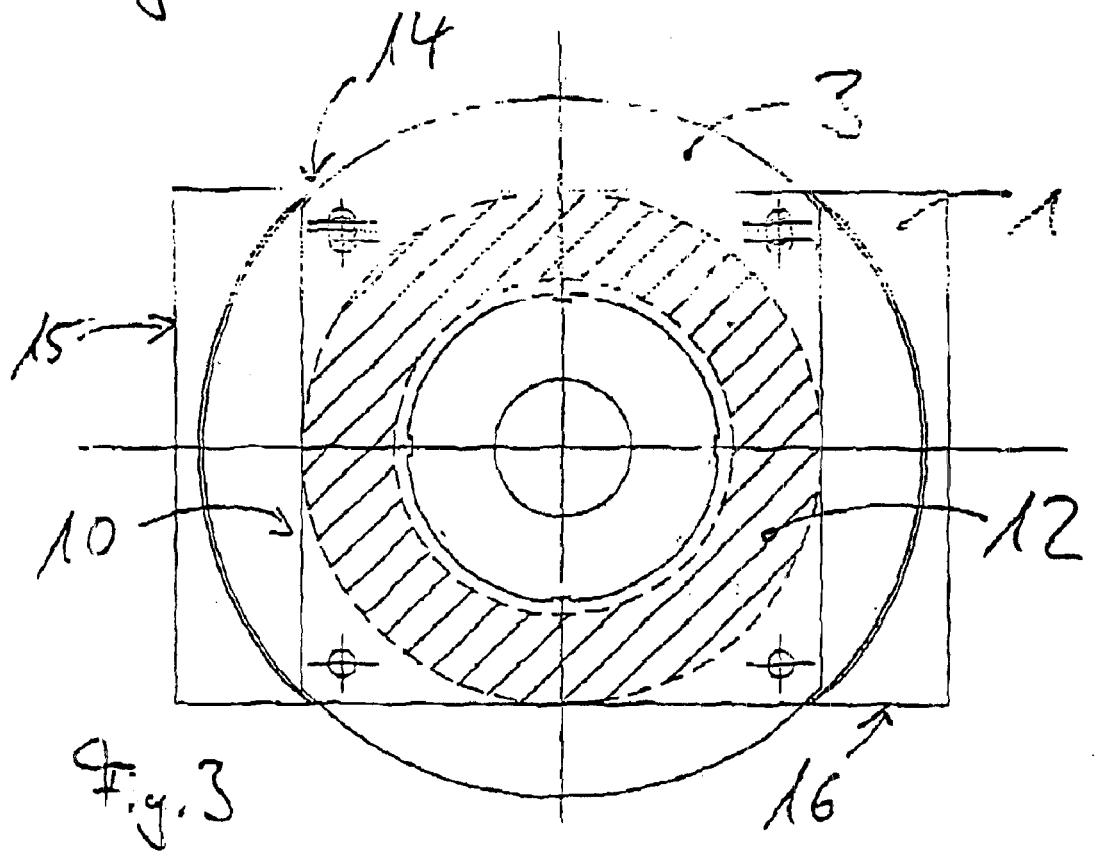
FIG. 3 a system in the playable state capable of use in a drive.
Figure 5:
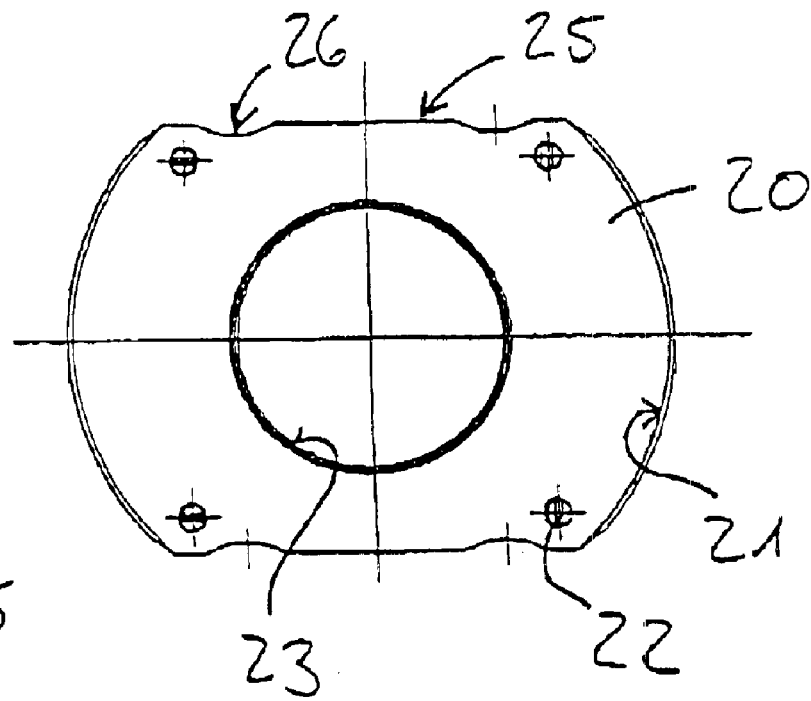
FIG. 5 a card with arcuate edges.
Figure 6:
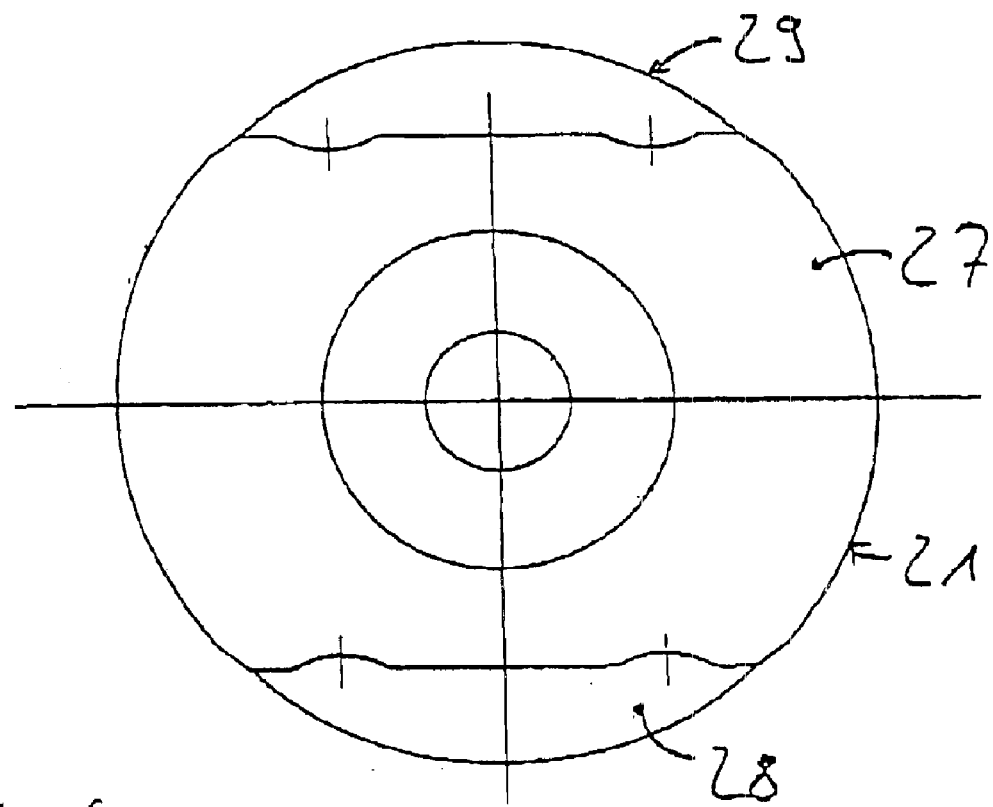
FIG. 6 a system in the playable state.

FIG. 3 shows the system in the state in which it can be inserted into the drive of a writing and/or reading appliance. Thus the CD 3 is rotated through 90° and mounted on the card and in this position the cut edges 10 of the storage medium are parallel to the transverse edges 15 and perpendicular to the longitudinal edges 16 of the card 1. The medium region 12 is exposed at the surface and can be read by a laser. With respect to the faces 9 between elements 1 and 3, there is a harmonious transition 14 which enables a precise insertion into the receiver of the reading appliance. The opening in the card has been formed in this state. In FIG. 5 a card 2 of plastic has been shown whose transverse edges 21, by comparison to the card 1 of FIG. 1, are circular ark shaped. From the surface of the card 2 again four symmetrical pins 22 project at the corners of a square, serving as means for the releasable attachment of a storage medium. The card 20 has a central opening 23 and guide edges 24 adapted thereto. In the longitudinal edges 25 (cut edges), gripping troughs 26 are provided. Since the circular arc-shaped transverse edges 21 of the card are similar to the circular arc-shaped transverse edges 29 of the storage medium 28, like the CD 3 described, in the playable state they complete a circle (FIG. 6) and the system formed by the two elements, card 20 and storage medium 28, is round like a CD.

What is claimed is:

1. A system encompassing a first and a second elements, whereby the first element is an optical storage medium that has a shape of a circular disk with two parallel cut edges of cut-off segments symmetrical to a center point and whereby the second element is a card, especially formed from synthetic resin, in a size of a business card or credit card, which is insertable in combination with the optical storage medium in a drive of a writing appliance and/or a reading appliance, comprising means which fastens the first and the second elements when the card and the storage medium are laid flat against one another in two relatively rotated positions, wherein the means are pins and bores on the first and the second elements, and the card has pins on a back side thereof which are insertable in corresponding bores in the storage medium for retention.

2. The system according to claim 1 wherein the card has the rectangular format of a business card or credit card.

3. The system according to claim 1 wherein the card is circular and has two parallel cut edges of cut off segments symmetrical to the center point, whereby the card and storage medium complete a circular disk in a state in which one is laid onto the other.

4. The system according to claim 1 wherein the means enables a releasable attachment of the first and the second elements.

5. The system according to claim 1 wherein the storage medium is a cut piece and the spacing of edges of the cut piece in the case of the storage medium corresponds generally to the width of the card.

6. The system according to claim 5 wherein the two positions are rotated by 90° relative to one another, whereby in one position the edges of the storage medium are parallel to longitudinal edges of the card.

7. The system according to claim 1 wherein the pins are frictionally retained in the bores.

8. The system according to claim 7, wherein the edges on their end faces form insertion aids.

9. The system according to claim 1 wherein the card has raised guide edges on its backside which describe a circle, whereby a diameter of the circle corresponds substantially to a diameter of the storage medium.

10. The system according to claim 9 wherein the diameter of the circle and the diameter of the storage medium is approximately 80 millimeters.

11. The system according to claim 1 wherein the card has a central circular opening which in a mounted system is coaxial to a central bore of the storage medium.

12. The system according to claim 11 wherein the opening is produced by breaking out a card part held by an intentional break location.

13. The system according to claim 1 wherein the card and/or the storage medium is printed with advertising.

14. An optical business or credit card assembly comprising:

a first element in a form of a flat optical storage medium having a central hole for centering said assembly in a reading or writing appliance for said optical storage medium, said optical storage medium having a pair of mutually parallel cut edges parallel to a longitudinal axis of said optical storage medium and a pair of circularly are segmental edges transverse to said longitudinal axis and extending between ends of said mutually parallel cut edges, said optical storage medium having a circular optical storage region centered on and surrounding said hole inwardly of said edges;

a second element in a form of a card having a size corresponding generally to that of a business or credit card lying flat against said optical storage medium and having a longitudinal axis, a central opening aligned with said hole, a pair of mutually parallel edges transverse to the longitudinal axis of said second element, and a pair of mutually parallel edges parallel to the longitudinal axis of said second element; and four symmetrically disposed pairs of fastening members located around said hole for securing said elements in two relatively offset angular positions including one position wherein said axes are parallel and said assembly has a configuration of a business or credit card and another position in which said axes are at 90° to one another and said circularly are segmental edges lie between spaced apart points of said longitudinal edges of said second element, one member of each of said pairs being a pin formed on one of said elements, another member of each of said pairs being a bore formed in the other of said elements and frictionally engaging the respective pin.

* * * * *